(12) United States Patent
Okamoto et al.

(10) Patent No.: US 8,158,544 B2
(45) Date of Patent: Apr. 17, 2012

(54) YTTRIA SINTERED BODY AND COMPONENT USED FOR PLASMA PROCESSING APPARATUS

(75) Inventors: Ken Okamoto, Amagasaki (JP); Tadahisa Arahori, Ashiya (JP)

(73) Assignee: Ferrotec Ceramics Corporation, Tokyo (JP)

( * ) Notice: Subject to any disclaimer, the term of this patent is extended or adjusted under 35 U.S.C. 154(b) by 0 days.

(21) Appl. No.: 12/913,073

(22) Filed: Oct. 27, 2010

(65) Prior Publication Data

US 2011/0129684 A1 Jun. 2, 2011

Related U.S. Application Data

(63) Continuation of application No. PCT/JP2008/068262, filed on Oct. 8, 2008.

(30) Foreign Application Priority Data

Apr. 28, 2008 (JP) .................. 2008-117505

(51) Int. Cl.
  C04B 35/50 (2006.01)
  C04B 35/51 (2006.01)
  C04B 35/00 (2006.01)
  B29D 11/00 (2006.01)

(52) U.S. Cl. ................. 501/152; 501/126; 264/1.22

(58) Field of Classification Search .......... 501/126, 501/152; 264/1.21, 1.22

See application file for complete search history.

(56) References Cited

U.S. PATENT DOCUMENTS

| | | | |
|---|---|---|---|
| 3,878,280 A | | 4/1975 | Dutta et al. |
| 4,166,831 A | * | 9/1979 | Rhodes et al. ........... 264/1.22 |
| 4,755,492 A | * | 7/1988 | Greskovich et al. ......... 501/126 |
| 5,013,696 A | * | 5/1991 | Greskovich et al. ......... 501/153 |
| 5,075,267 A | * | 12/1991 | Fujii et al. ............... 501/126 |
| 6,410,471 B2 | * | 6/2002 | Kaneyoshi ................. 501/152 |
| 7,932,202 B2 | * | 4/2011 | Hamada .................. 501/152 |

FOREIGN PATENT DOCUMENTS

| | | |
|---|---|---|
| JP | 04-238864 | 8/1992 |
| JP | 2001-151559 | 6/2001 |
| JP | 2001-164354 | 6/2001 |
| JP | 2001-181042 | 7/2001 |
| JP | 2001-233676 | 8/2001 |
| JP | 2002-68838 | 3/2002 |
| JP | 2002-308683 | 10/2002 |
| JP | 2004-010981 | 1/2004 |
| JP | 2004-244294 | 9/2004 |
| JP | 2004-269350 | 9/2004 |
| JP | 2004-292270 | 10/2004 |
| JP | 3619330 | 11/2004 |
| JP | 2006-008493 | 1/2006 |
| JP | 2007-045700 | 2/2007 |
| JP | 2007-51045 | 3/2007 |
| WO | 2005/009919 | 2/2005 |
| WO | WO-2005/009919 | * 2/2005 |

* cited by examiner

*Primary Examiner* — Jerry Lorengo
*Assistant Examiner* — Noah Wiese
(74) *Attorney, Agent, or Firm* — Clark & Brody

(57) ABSTRACT

To provide a high purity Yttria sintered bodies having a high strength, a low dielectric loss and high plasma corrosion resistance of halogen gas during wide range surface roughness (Ra). An Yttria sintered body having a dielectric loss tan $\delta$ of $1\times10^{-4}$ or less in the frequency range from 1 to 20 GHz, wherein the Yttria sintered body contains Yttria of 99.9% by mass or more, has a porosity of 1% or less and an average crystal grain size of 3 μm or less, and the cumulative frequency ratio calculated from the following formula (1) is 3 or less: Cumulative frequency ratio=D90/D50. In the above-described formula (1), the meanings of the individual symbols are as follows: D90: The crystal grain size (μm) at which the cumulative number of grains as calculated from the smaller grain size side is 90% in the grain size distribution of the crystal grains in terms of the number of grains. D50: The crystal grain size (μm) at which the cumulative number of grains as calculated from the smaller grain size side is 50% in the grain size distribution of the crystal grains in terms of the number of grains.

4 Claims, No Drawings

US 8,158,544 B2

YTTRIA SINTERED BODY AND COMPONENT USED FOR PLASMA PROCESSING APPARATUS

The disclosure of International Application No. PCT/JP2008/068262 filed Oct. 8, 2008 including specification, drawings and claims is incorporated herein by reference in its entirety.

TECHNICAL FIELD

The present invention relates to an Yttria (Yttrium oxide) sintered body. The Yttria sintered body is particularly suitable for use as a corrosion-resistant member in a plasma processing-involving apparatus such as a semiconductor manufacturing apparatus.

BACKGROUND ART

High-purity Yttria sintered bodies are known to exhibit remarkably higher resistance to halogen-based corrosive gases and plasmas of such gases as compared to other common ceramic materials such as alumina, silicon carbide, silicon nitride and zirconia, and are applied to corrosion-resistant components in plasma processing-involving semiconductor manufacturing apparatuses. However, Yttria is a high-price material, and also suffers from persisting problems such as low strength of sinters of Yttria to disturb the development of Yttria as structural materials. Accordingly, used as corrosion-resistant members in some cases are components produced by spraying Yttria to a base material formed of a metal material or formed of a ceramic material made of other materials such as alumina, lower in price and higher in strength than Yttria.

Patent Document 1 discloses an invention of a sprayed member in which a metal undercoat layer and a composite intermediate layer composed of Yttria and alumina are disposed between a base material and an Yttria sprayed film, and thus the adhesion to the base material and the resistance to halogen-based plasma are improved. Patent Document 2 discloses an invention of a corrosion-resistant component made to acquire a high adhesiveness and a high hardness as a sprayed film by performing spraying of Yttria in a double anode type plasma spraying apparatus while an oxygen-containing gas is being fed.

However, in general, a sprayed film is more abundant in pores as compared to a sintered body made of the same material as the material for the sprayed film. In other words, according to the invention described in Patent Document 1, the porosity of the surface layer directly exposed to the plasma is as large as 5 to 9%. On the other hand, according to the invention described in Patent Document 2, although realized is a low porosity for a sprayed film in such a way that the cumulative pore volume of the pore sizes of 0.1 μm or more and 100 μm or less is 0.0080 cc/g or less, even such a low porosity is beyond comparison with the porosity of a sintered body. When these Yttria sprayed components are used as constituent components of a plasma processing apparatus, there occur the problems that the etching rate of the material being processed in the plasma processing is increased, a large number of particles occur due to the reaction product between the gas species constituting the plasma and the corrosion-resistant member or the exfoliated Yttria particles, and thus the particles contaminate the processed articles such as wafers.

Additionally, the case of an Yttria sprayed member has a risk of the exfoliation of the Yttria sprayed film from the base material of the substrate. Further, the presence of the substrate base material as a foreign material and the interface as another foreign material makes heterogeneous the density, the mechanical properties, the thermal properties, the electric properties and the like as the whole member, and hence the sprayed member is disadvantageous with respect to the microwave transmittance and the plasma generation efficiency.

Owing to such circumstances, an attempt to constitute a corrosion-resistant member exclusively with a high-purity Yttria sintered body is being made to proceed.

Patent Document 3 discloses an invention of close sintering Yttria wherein the Yttria sintered body includes Y in an amount of 99.9% by mass or more in terms of $Y_2O_3$, and the difference between the average crystal grain size in the surface portion and the average crystal grain size in the deep portion is 30 μm or less. According to this invention, preferable properties are obtained with respect to the plasma corrosion resistance and the dielectric loss.

Patent Document 4 discloses an invention of a corrosion-resistant ceramic member constituted with an Yttria sintered body containing as a sintering aid 3 to 50000 ppm by weight of at least one or more of Zr, Si, Ce and Al. It is stated that this invention is excellent in corrosion resistance.

Patent Document 5 discloses an invention of an Yttria sintered body in which a boron compound is added as a sintering aid to an Yttria powder, and boron is made to present as $Y_3BO_6$ in a sinter. The content of $Y_3BO_6$ contained in the Yttria sintered body is specifically set to fall within a range of 0.12% by volume or more and 60% by volume or less. It is stated that this invention enables to simply obtain an Yttria sintered body high in density and excellent in plasma corrosion resistance at relatively low temperatures.

As an invention focusing on dielectric loss, Patent Document 6 discloses an invention of a corrosion-resistant member being formed of a sintered body including Yttria($Y_2O_3$) of 99.0% by mass or more, Ti of 0.01% by mass or more and less than 1% by mass in terms of the oxide, $SiO_2$ of 300 ppm or less as an inevitable impurity, $Fe_2O_3$ of 100 ppm or less as an inevitable impurity and alkali metal oxides of 100 ppm as inevitable impurities and having a dielectric loss of $2\times10^{-4}$ or less for microwaves of 10 MHz to 5 GHz. This invention also describes an example in which the dielectric loss tan δ at 1 GHz to 5 GHz was made to be $1\times10^{-4}$ or less.

Patent Document 7 discloses a component used for a plasma processing apparatus constituted with a ceramic sintered body in which the portion exposed to the plasma is mainly composed of a compound containing the 3a Group elements of the periodic table, the surface roughness (Ra) is 1 μm or less and the porosity is 3% or less. It is stated that this invention exhibits excellent corrosion-resistance to the halogen-based corrosive gases and the plasma of the halogen-based corrosive gases.

Patent Document 8 discloses a plasma-resistant component constituted with an Yttria sintered body in which Ra is 2.5 μm or less and the porosity is 2% or less. It is stated that this invention enables to improve the plasma corrosion resistance and enables to reduce the generation of particles by sintering in a hydrogen atmosphere, by adding yttrium aluminate and by others.

Patent Document 9 discloses an invention in which the surface of various ceramic base materials such as Yttria is subjected to a corrosion treatment in an acidic etching solution and thus the surface is made to have asperities. It is stated that this invention enables to reduce the particles owing to the anchor effect.

Patent Document 10 discloses an invention of a corrosion-resistant component formed of the Yttria sintered body with etching treatment with an acid such as a hydrofluoric acid-nitric acid mixture. It is stated that this invention enables to remove the process fracture layer and also enables to reduce the generation of particles.

Patent Document 11 discloses an invention of a high-purity Yttria sintered body obtained by sintering at 1710 to 1850° C. in a hydrogen atmosphere.

Various inventions of plasma-resistant ceramics other than Yttria sintered bodies have been disclosed; among others, the following invention is to be quoted as an invention in which an investigation to decrease the dielectric loss has been made.

Patent Document 12 describes an invention of a plasma corrosion-resistant component, as a component to be used under a plasma and having a corrosion resistance to the plasma, formed of an aluminum nitride sintered body obtained by heat treating, at a temperature of 1600 to 2000° C. in a carbon atmosphere, a sintered body produced by sintering with a sintering aid and by thereby removing the generated crystal grain boundary phase containing the sintering aid. In an example of this invention, it is stated that the dielectric loss can be decreased by half; however, the dielectric loss is still about $1\times10^{-3}$ (GHz band). Additionally, the performance of such a heat treatment as described above reduces the material strength.

Patent Document 13 discloses an invention of a plasma corrosion-resistant material in which a dielectric loss tan δ of $1\times10^{-4}$ is attained by adding yttrium oxide and magnesium oxide or magnesium nitride to aluminum nitride, and by regulating the various conditions such as the contents of these compounds, the slow cooling conditions after sintering and the annealing conditions. However, precise control of the conditions is required, and hence there is an adverse possibility that the degradation of the properties of the products due to the quality variation may occur when large size members are mass produced by using a large volume sintering furnace.

Patent Document 14 discloses an invention of a corrosion-resistant member formed of a sintered body which contains Al and at least one of the rare earth elements as the metal components and has a main crystal phase mainly composed of a composite oxide (such as a garnet type, a merrillite type, or a perovskite type) of Al and the rare earth element(s), wherein: the content of metal elements other than Al and the rare earth element(s) is 500 ppm or less, the relative density is 98% or more, and the maximum grain size of the crystal grains of the main crystal phase is 10 μm or less; and in the frequency range from 0.4 MHz to 10 GHz, the relative dielectric constant is 13 or less and the dielectric loss is $5\times10^{-4}$ or less. However, even in this invention, the dielectric loss does not reach the level of less than $1\times10^{-4}$, the plasma corrosion resistance exhibits a tendency of being lowered with the increase of the inclusion proportion of Al, and the concerned sintered body does not show any identifiable superiority with respect to the dielectric properties and the corrosion resistance as compared to corrosion-resistant members including a single rare earth element, such as an Yttria sintered body.

[Patent Document 1] JP2001-164354A
[Patent Document 2] JP2004-10981A
[Patent Document 3] WO 2005/009919
[Patent Document 4] JP2001-181042A
[Patent Document 5] JP2007-45700A
[Patent Document 6] JP2004-292270A
[Patent Document 7] JP3619330B
[Patent Document 8] JP2002-68838A
[Patent Document 9] JP2002-308683A
[Patent Document 10] JP2004-244294A
[Patent Document 11] JP2004-269350A
[Patent Document 12] JP2001-233676A
[Patent Document 13] JP2006-8493A
[Patent Document 14] JP2001-151559A

DISCLOSURE OF THE INVENTION

Problems to be Solved by the Invention

It is preferable to use ceramic structural materials as small in dielectric loss as possible in an apparatus involving a processing with a high frequency wave (such as microwave) such as a plasma processing apparatus. The reasons for this include the advantages such that structural materials small in dielectric loss are excellent in microwave transmittance to improve the plasma generation efficiency, the amount of heat generation due to the absorbed microwave is made smaller to alleviate the design restrictions due to the thermal stress and the mechanical strength of the structural materials, and thus the degree of freedom of product shapes is increased.

Yttria is a material known by exhibiting excellent properties as a plasma processing corrosion-resistant member because Yttria has a high resistance to halogen-based corrosive gases and the plasmas of these gases. If it is possible to impart to an Yttria sintered body a mechanical strength required as a structural material as well as a low dielectric loss property, such an Yttria sintered body comes to be an excellent material as a structural material for the high-frequency plasma processing.

Although a technique for forming an Yttria sprayed film on a ceramic base material can be employ for the purpose, as described above, various problems such as a limited reduction of the porosity, unsuccessful prevention of the generation of particles and the adverse possibility of exfoliation of the Yttria sprayed film.

However, when an Yttria sintered body itself is used as a member for a plasma processing apparatus, various problems are encountered as left to be solved. Specifically, such various problems include: the low mechanical strength; and the occurrence of the scattering of the particles of the Yttria powder dust finely exfoliated due to the solid phase reaction product with the halogen-based corrosive gas, due to impact or due to the like, and further the occurrence of the contamination of the wafer, at the time of being exposed to the plasma in the case of the persistence of the residual closed pores in the structural material.

Examples of the invention in which a corrosion-resistant member is constituted only with a high-purity Yttria sintered body include the inventions described in above-listed Patent Documents 3 to 6; however, the Yttria sintered bodies of the concerned inventions suffer from the problems shown below.

In the invention described in Patent Document 3, the material strength thereof stays as low as 138 MPa even under the optimal conditions.

In the invention described in Patent Document 4, the sintering aids other than Ce offer the factors degrading the plasma corrosion resistance. It is to be added that Ce scarcely degrades the plasma corrosion resistance, but even Ce cannot improve the plasma corrosion resistance. The aid comes to be an impurity component for the Yttria sintered body, and hence is inferred to offer a factor degrading the dielectric loss of the sintered body.

In the invention described in Patent Document 5, it is stated that the liquid phase sintering is to be performed, and hence the presence of the glass phase (Y—B—O) is anticipated. Accordingly, the reduction of the dielectric loss is difficult.

In the invention described in Patent Document 6, although Ti ($TiO_2$) is added in order to improve the density of a sintered body, the effect such that the Ti addition itself improves the dielectric properties has not been verified. On the other hand, the tendency such that the plasma corrosion resistance is lowered with the increase of the Ti content has been verified. Accordingly, if another technique enables to improve the density, it is recommended to avoid the inclusion of Ti. Also, in this invention, the average crystal grain size is set at 2 μm or more in order to improve the dielectric properties of the crystal grain boundary, and hence there is a possibility that the particle growth in the sintered body causes the decrease of the material strength.

In Patent Document 7, although the decrease effect of the etching rate has been sufficiently investigated for the case of the exposure to a halogen-based plasma, the particle contamination of the wafer under treatment has been scarcely investigated. According to an example in Patent Document 1, when Ra exceeds 1 μm, the etching rate is high and the plasma corrosion resistance is abruptly degraded. Therefore, the use of the member of Patent Document 1 inhibits the surface of the component from being provided with asperities for the purpose of preventing the scattering of particles.

Also in the invention described in Patent Document 8, with the increase of the surface roughness Ra, the degradation of the plasma corrosion resistance becomes remarkable. In other words, for the purpose of realizing the prevention of the scattering of particles and realizing the low etching rate, it is necessary to perform a measure to make difficult the detachment of particles from the surface layer, such as the performance of a material design to make difficult the occurrence of the fine machining trace in the surface roughening treatment.

Patent Document 9 discloses that for the purpose of forming a satisfactory roughened surface geometry condition, required is a long-time treatment with a treatment solution such as sulfuric acid or phosphoric acid under heating and under pressurized conditions and a simple surface roughening technique such as a blasting treatment is insufficient. Also, in Patent Document 9, the identification of the anchor effect by an SEM observation of the cross section has been verified only for alumina and YAG (yttrium aluminum garnet: $Y_3Al_5O_{12}$), but has not been verified for an Yttria sintered body. Accordingly, Patent Document 9 discloses no such a high corrosion-resistant, high-purity Yttria sintered body that permits attaining only with a blasting treatment a satisfactory effect in preventing the scattering of particles.

The invention described in Patent Document 10 reduces the Ra down to less than 0.8 μm in order to improve the plasma corrosion resistance; thus, the surface of the product is smoothed out, and hence no anchor effect is obtained and it is difficult to prevent the scattering of particles.

As shown in an example in Patent Document 11, the bending strength of the Yttria sintered body described in this document is as low as 50 to 145 MPa. Therefore, this Yttria sintered body is low in reliability as a structural material, and undergoes restrictions for grinding processing such that manufacturing large-size products, formation of complicated shapes and application of screw clamp structure or the like are impossible. Therefore, in the Yttria sintered body, it is difficult to perform additional treatments such as surface roughening and it is impossible to prevent the scattering of particles caused by the plasma processing.

The object of the present invention is to provide an Yttria sintered body which has a high bending-strength of 180 MPa or more, is excellent in plasma corrosion resistance, is low in the scattering of particles, and is low in the dielectric loss in the microwave range of 1 GHz or more i.e. excellent in microwave transmittance. The Yttria sintered body is applicable to a structural component disposed in a plasma processing reaction chamber such as a focus ring as a structural component and a chamber as a structural component in an apparatus using a halogen-based corrosive gas and the plasma of the halogen-based corrosive gas, such as a CVD film formation apparatus or an etching apparatus.

Means for Solving the Problems

When a member large in dielectric loss is used for a portion exposed to plasma in a microwave frequency range from 1 to 20 GHz, the microwave transmittance is decreased, and the attenuated fraction is released as heat. Therefore, the plasma efficiency would be decreased and at the same time, the temperature would be heterogeneous due to heat generation, and the member would be broken due to thermal stress. Therefore, in the Yttria sintered body according to the present invention, it is an object to attain a dielectric loss tan δ of $1 \times 10^{-4}$ or less in the frequency range from 1 to 20 GHz.

The tan δ is a value defined as the "dielectric tangent" in the "electric insulating material—the measurement method of relative dielectric constant and dielectric tangent" specified by JIS C 2138.

It is advantageous if the member used for a plasma processor is capable of being made thin in thickness, with respect to the microwave output power, the plasma generation efficiency, the thermal design and the like. On the other hand, the member used for a plasma processor is required to have a strength needed as a structural material. Accordingly, the Yttria sintered body used as the member used for a plasma processor preferably has a high strength. Therefore, in the Yttria sintered body according to the present invention, it is an object to attain a three-point bending strength $\sigma_{b3}$ at room temperature of 180 MPa or more according to the "test method of room-temperature bending strength of fine ceramics" specified by JIS R 1601.

The present inventors first made various studies from the viewpoints of the improvement of the mechanical strength and the plasma corrosion resistance of an Yttria sintered body and the prevention of the scattering of particles in an Yttria sintered body.

Accordingly, the present inventors have designed a sintered body, obtained from a high-purity Yttria material, free from troubles even when used in the semiconductor manufacturing process in such a way that the sintered body has an average crystal grain size of 3 μm or less, a porosity of 1% or less and a bending strength of 180 MPa or more. The present inventors have discovered that the Yttria sintered body is capable of being easily roughened on the surface thereof by a blasting treatment, and even when the surface of the sintered body is roughened, the plasma corrosion resistance (plasma etching rate) of the sintered body is barely degraded as compared to a smooth surface (a mirror polished product).

The present inventors further made a diligent study on the premise of using a sintered body of Yttria (yttrium oxide) further excellent in plasma corrosion resistance as compared to alumina, aluminum nitride and YAG, and consequently have discovered that the control of the average crystal grain size of the Yttria sintered body to be 3 μm or less enables to obtain in many cases a member having an extremely high strength as yttrium oxide in such a way that the bending strength is 180 MPa or more, and being provided with an excellent microwave transmittance in such a way that the dielectric loss is of a level lower than $1 \times 10^{-4}$.

However, the present inventors also discovered that the reduction of the average crystal grain size alone cannot restrict the dielectric loss tan δ so as to be $1\times10^{-4}$ or less. Therefore, the present inventors further made a continuous study, and consequently have brought the present invention to completion by discovering that by restricting the variation of the crystal grain size, specifically, by restricting the "cumulative frequency ratio" defined by the following formula so as to be 3 or less, the dielectric loss tan δ of the Yttria sintered body can be made to be $1\times10^{-4}$ or less without failure:

Cumulative frequency ratio=D90/D50

In the above-described formula, the meanings of the individual symbols are as follows:

D90: The crystal grain size (μm) at which the cumulative number of grains as calculated from the smaller grain size side is 90% in the grain size distribution of the crystal grains in terms of the number of grains.

D50: The crystal grain size (μm) at which the cumulative number of grains as calculated from the smaller grain size side is 50% in the grain size distribution of the crystal grains in terms of the number of grains.

The present invention involves the Yttria sinter shown in the following (A) to (F) and the member used for a plasma processor shown in the following (G).

(A) An Yttria sintered body having an average crystal grain size of 3 μm or less, a porosity of 1% or less and a bending strength of 180 MPa or more.

(B) The Yttria sintered body according to (A), having a surface roughness (Ra) of 0.05 to 5 μm.

(C) The Yttria sinter according to (B), wherein the plasma etching rate E thereof satisfies the relation of the following formula.

$$E \leq 1.20 \times E_0$$

In the above-described formula, E and $E_0$ respectively mean the etching rates (nm/min), in application of a fluorine-based gas plasma processing under the same conditions, of the Yttria sintered bodies made of the same material and different only in the surface roughness, and $E_0$ means the etching rate (nm/min) for the Yttria sintered body having a surface roughness (Ra) of 0.05 μm.

(D) An Yttria sinter having a dielectric loss tan δ of $1\times10^{-4}$ or less in the frequency range from 1 to 20 GHz, wherein the Yttria sintered body contains Yttria of 99.9% by mass or more, has a porosity of 1% or less and an average crystal grain size of 3 μm or less, and the cumulative frequency ratio calculated from the following formula is 3 or less.

Cumulative frequency ratio=D90/D50

In the above-described formula, the meanings of the individual symbols are as follows.

D90: The crystal grain size (μm) at which the cumulative number of grains as calculated from the smaller grain size side is 90% in the grain size distribution of the crystal grains in terms of the number of grains.

D50: The crystal grain size (μm) at which the cumulative number of grains as calculated from the smaller grain size side is 50% in the grain size distribution of the crystal grains in terms of the number of grains.

(E) The Yttria sintered body according to (D) having a bending strength of 180 MPa or more.

(F) The Yttria sintered body according to (D) or (E) having an average crystal grain size of 2 μm or less.

(G) A member used for a plasma processor, wherein at least the portion of the member exposed to a halogen-based corrosive gas or the plasma of the halogen-based corrosive gas is constituted with the Yttria sintered body according to any one of (A) to (F).

Advantages of the Invention

The Yttria sintered body of the present invention has a bending strength of 180 MPa or more which is at an extremely high level as the bending strength of an Yttria sintered body obtained by ordinary sintering. A bending strength as high as 200 MPa or more is realizable under the most appropriate conditions. Consequently, it comes to be possible to control over a wide range the surface roughness of the Yttria sintered body to be used as a corrosion-resistant member. Further, the Yttria sintered body of the present invention undergoes a small decrease in the plasma etching rate even when the surface is roughened.

Accordingly, when part or the whole of the Yttria sintered body of the present invention is surface-roughened and the thus processed Yttria sintered body of the present invention is used at least as a corrosion-resistant member exposed to a halogen-based corrosive gas or the plasma of the halogen-based corrosive gas in a plasma processor, it is also possible to prevent the scattering of particles while a high plasma corrosion resistance is being maintained. The Yttria sintered body of the present invention is excellent in material strength as compared to conventional Yttria sintered body, and hence is easily made thin in wall thickness and is developable into products such as products improved in heat transfer. Additionally, the Yttria sintered body of the present invention can be produced even by normal pressure sintering, and hence it comes to be possible to perform product designs for such complicated shapes and large size products that undergo restrictions with hot-press sintering or hot isostatic pressing (HIP method).

According to the present invention, in addition to the high plasma corrosion resistance characteristic of Yttria, the bending strength is 180 MPa or more, the scattering of particles is small, and further a low dielectric loss is realized in such a way that the dielectric loss tan δ is $1\times10^{-4}$ or less in a frequency range from 1 to 20 GHz. Accordingly, when the Yttria sintered body of the present invention is used as a structural member of a plasma processor, the attenuation of the microwave and the heat generation accompanying this attenuation are suppressed, and the plasma generation efficiency is significantly improved. In particular, the Yttria sintered body of the present invention has a high bending strength so as to enable the member to be reduced in wall thickness, and also is an advantageous material with respect to the output power of the microwave, the efficiency aspect, the thermal design and the like. Additionally, the Yttria material powder is high in price, and hence when the used amount of the material is reduced by making thin the product wall, it is also possible to obtain a significant merit with respect to cost.

The Yttria sinter of the present invention is particularly suitable used for a portion exposed to the plasma in the microwave region falling in the frequency range of 1 GHz or more, and also enables to realize the reduction of the dielectric loss of the RF wave and the like in the frequency range of 1 GHz or less and hence is also suitably usable in a portion exposed to the plasma of such RF wave and the like. In other words, the application of the Yttria sintered body of the present invention is not restricted to the member to be used in the portion exposed to the plasma in the microwave region falling in the frequency range of 1 GHz or more.

BEST MODE FOR CARRYING OUT THE INVENTION

When the average crystal grain size of an Yttria sintered body exceeds 3 µm, the strength of the sinter is decreased and it is impossible to attain a bending strength of 180 MPa or more. Additionally, the grain migration away from the crystal grain boundary portion tends to occur, and it comes to be difficult to ensure the plasma corrosion resistance in the case where the surface roughening is performed. Therefore, the average crystal grain size is set to fall in a range of 3 µm or less.

Although the smaller the average crystal grain size is, the more preferable, it is difficult to render the crystal grain size of the sintered body equal to or less than the particle size of the starting material powder, because of the growth of the crystal grains at the time of sintering. Accordingly, it is preferable to use a primary material powder having an average particle size as small as possible and having a narrow particle size distribution (uniform in particle size) within such ranges that cause no problems associated with manufacturing processes.

The porosity of the Yttria sintered body significantly affects the compactness. In addition, when the porosity exceeds 1%, the bending strength is decreased, and at the same time, the plasma etching rate is increased. The amount of the generated particles is also increased. Therefore, the porosity is set at 1% or less.

The Yttria sintered body of the present invention has a bending strength of 180 MPa or more, and hence has a large degree of freedom of grinding processing. Therefore, the surface roughness based on the surface roughening treatment such as a blasting treatment can be easily regulated, and the scattering of particles can be prevented without increasing the plasma etching rate. The heat transference of a product can be improved by thinning the wall thickness, and hence the reliability used for a heated environment can be improved. The bending strength is preferably 200 MPa or more.

When the surface roughness (Ra) of the Yttria sintered body is too low, the particles produced at the time of plasma processing tend to be scattered without being captured in the surface layer of the corrosion-resistant member. When the surface roughness is less than 0.05 µm, the scattering of particles is remarkable. On the other hand, when the surface roughness Ra exceeds 5 µm, the surface area of the plasma-exposed face is too large, the corrosion resistance is lowered, and additionally the particle detachment from the surface layer tends to occur. Therefore, it is preferable to regulate the surface roughness Ra to fall within a range from 0.05 to 5 µm. For the purpose of more reducing the amount of scattered particles, it is preferable to set Ra to be 1 µm or more.

Specifically, no increase of the plasma etching rate means that the plasma etching rate E satisfies the relation of the following formula:

$$E \leq 1.20 \times E_0$$

In the above-described formula, E and $E_0$ respectively mean the etching rates (nm/min), in application of a plasma processing under the same conditions, of the Yttria sintered body made of the same material and different only in the surface roughness, and $E_0$ means the etching rate (nm/min) for the Yttria sinter having a surface roughness (Ra) of 0.05 µm.

An Yttria sintered body in which the increment of the plasma etching rate from before and to after the surface roughening exceeds 20% is insufficient in corrosion resistance. For the purpose of obtaining an Yttria sintered body that satisfies the above-described formula (1), it is of course necessary to regulate the crystal grain size and the porosity so as to fall within the ranges specified in the present invention, respectively, and additionally, it is also necessary to select a high-purity Yttria powder.

The Yttria sintered body according to the present invention is required to be highly pure, namely, to contain Yttria of 99.9% by mass or more. This is because the presence of impurities causes the increase of the dielectric loss and at the same time facilitates the grain growth, and hence adversely affects the control of the crystal grains. The Yttria sintered body is a member to be used in the semiconductor processes, and hence, for the purpose of suppressing the effect on the material under treatment, the content of the impurities in the Yttria sinter is preferably as small as possible. Therefore, in the present invention, the content of Yttria in the Yttria sintered body is set at 99.9% by mass or more.

From the viewpoint of achieving a high density and a high strength, it is also effective to use a sintering agent However, as described above, a sintering aid degrades the plasma corrosion resistance and increases the dielectric loss, as the case may be, and hence is not used in the present invention.

In the Yttria sintered body according to the present invention, it is necessary to restrict the porosity to be 1% or less. This is because when the porosity exceeds 1%, the densification of the sinter is insufficient, the bending strength cannot be made to be 180 MPa or more, and additionally, the dielectric loss tan δ cannot be restricted to $1 \times 10^{-4}$ or less. Additionally, when the porosity is large, the etching rate is increased and the decrease of the plasma corrosion resistance is also caused.

Next, in the Yttria sintered body according to the present invention, the average crystal grain size thereof is required to be set at 3 µm or less. When the average crystal grain size exceeds 3 µm, the bending strength cannot be made to be 180 MPa or more, and additionally, the dielectric loss tan δ cannot be restricted to $1 \times 10^{-4}$ or less. Therefore, the average crystal grain size of the Yttria sintered body is set at 3 µm or less. When the average grain size is large, specific crystal grains grow large, the variation of the crystal grain sizes in the whole sintered body is increased, and hence the average crystal grain size is preferably as small as possible, and is recommended to be restricted to 2 µm or less.

However, the decrease of the average crystal grain size alone cannot restrict the dielectric loss tan δ to $1 \times 10^{-4}$ or less, and hence it is necessary to restrict the variation of the crystal grain size, and specifically, it is necessary to restrict the cumulative frequency ratio defined by the following formula to 3 or less:

$$\text{Cumulative frequency ratio} = D90/D50$$

In the above-described formula, the meanings of the individual symbols are as follows:

D90: The crystal grain size (µm) at which the cumulative number of grains as calculated from the smaller grain size side is 90% in the grain size distribution of the crystal grains in terms of the number of grains.

D50: The crystal grain size (µm) at which the cumulative number of grains as calculated from the smaller grain size side is 50% in the grain size distribution of the crystal grains in terms of the number of grains.

In other words, when the cumulative frequency ratio exceeds 3, the variation of the crystal grain size is large, and it is impossible that the dielectric loss tan δ of the Yttria sintered body is made to be $1 \times 10^{-4}$ or less without failure. Therefore, in the present invention, the average crystal grain size is restricted to 3 µm or less, and the cumulative frequency ratio defined by the above-described formula is set at 3 or less.

The measurement of the average crystal grain size may be performed according to the technique specified for metal materials in JIS G 0551. It is to be recommended that: an optional cross section of the sintered body is cut out; the surface layer of the cross section is mirror polished; further a heat treatment of the surface layer is performed for selectively heat etching the crystal grain boundary portion, and thus the individual crystal grains are visualized so as to form a surface condition that facilitates the observation of the grain sizes; and thereafter, the crystal grain microstructure is photographed by using a microscope, an SEM or the like.

The calculation of the average crystal grain size is performed as follows: a frame of a known area (a photographic scope itself may be used, or a specific circular or rectangular pattern may be set within the photographic scope) is defined; the crystal grains completely included within the frame are each counted as one crystal grain; the crystal grains intersected by the periphery of the frame are each counted as one half of a crystal grain; thus, the total number of the crystal grains within the frame is obtained by the accumulation of the number of the crystal grains; the area of the frame is divided by the thus obtained total number of the crystal grains to derive the average area per one crystal grain; and finally, the square root value of the average area is defined as the average crystal grain size.

D90 and D50 are obtained as follows. The photographing of the crystal grain microstructure is performed in the same manner as in the calculation of the average crystal grain size; for each of the crystal grains, the major axis (the longest line that can be drawn) and the minor axis (the axis on the line perpendicularly bisecting the major axis line) are drawn to be measured; and the average of the major axis and the minor axis is defined as the grain size of each of the crystal grains. In counting the number of the crystal grains, the crystal grains completely included within the photographic scope are exclusively the objects of the counting, and the crystal grains intersected by the outer periphery of the scope so as for the shapes thereof to be at least partially obscure are excluded from the counting. From the collected crystal grain sizes, a crystal grain size distribution curve is formed in terms of the number of the crystal grains, and from the thus obtained crystal grain size distribution curve, the 50% cumulative value (D50) and the 90% cumulative value (D90) are obtained.

The Yttria sintered body according to the present invention can be produced, for example, as follows: an Yttria material powder is granulated, molded, subjected to a processing before sintering where necessary, then sintered, and subjected to a grinding processing into the shape of a product. As long as the conditions such as the denseness and the crystalline state are satisfied, either of the constant pressure sintering method and the hot-press sintering method may be adopted as the sintering method. When the hot-press sintering is adopted for the sintering, it is possible to directly obtain a sinter by filling the material powder in a dedicated mold and by performing a uniaxial pressing heat treatment.

The granulation of the Yttria material powder can be performed, for example, as follows: a binder and the like are mixed with the Yttria material powder to prepare a slurry, and then an Yttria granular powder is obtained from the slurry by a technique such as spray drying. Here, used as the Yttria material powder is an Yttria material powder having a purity of 99.9% or more. Additionally, it is recommended to use an Yttria material powder having an average particle size of 0.5 µm or less. This is because with such an Yttria material powder, a close sintered body having a porosity of 1% or less is easily obtained, and further, even when the grain growth occurs at the time of sintering, the average crystal grain size of the sintered body is easily controlled to be 3 µm or less. For the purpose of improving the qualities (purity, low porosity, and crystal uniformity) of the sinter, it is also preferable to perform, at the stage of the slurry, deironization and the removal of foreign matters and coarse particles.

With such an Yttria material powder, a material having intended performances is easily obtained by an atmospheric sintering, without using in the subsequent sintering step any specific technique such as the hot-press sintering and the HIP (hot isostatic pressing) treatment after the sintering. When the purity of the material is low, the semiconductor manufacturing process may be adversely affected, and further, the grain boundary segregation of the impurity components, the heterogeneous grain growth or the like is caused, and thus, the decrease of the material strength and the lowering of the plasma corrosion resistance may be caused.

In the slurry preparation, the following additives may also be used: a deflocculant such as a commercially available polyacrylic acid salt or carboxylic acid salt, a binder such as a commercially available acrylic or PVC binder, and additionally, a plasticizer such as polyethylene glycol, a defoaming agent, a lubricant such as a stearic acid salt. The types and the mixing amounts of these additives may be appropriately selected and regulated in consideration of the factors such as the ensuring of the strength of the green body (pre-sintered ceramics like molded body is called "Green body"), the crushing property of the granules and the impartment of the flexibility suitable for the processing before sintering. When the mixing amount of the binder is small, the binder is not uniformly distributed around the grains at the time of molding and hence the grains are not neatly crushed; conversely, when the mixing amount of the binder is large, the moldability is improved, but the evaporation amount of the binder at the time of sintering is increased, hence the risk of the occurrence of sintering cracks is enhanced and the voids after the evaporation of the binder are also increased, to lead to the occurrence of the adverse effects such as the increase of the porosity of the sintered body.

The types and the mixing amounts of these additives may be appropriately selected and regulated in consideration of the factors such as the ensuring of the strength of the green body, the crushing property of the granules and the impartment of the flexibility suitable for the processing before sintering. When the mixing amount of the binder is small, the binder is not uniformly distributed around the grains at the time of molding and hence the grains are not neatly crushed; conversely, when the mixing amount of the binder is large, a high density of the green body can be attained at the time of molding, but when the binder is evaporated at the time of sintering, large voids are formed and the final density is hardly increased, and the dry workability before the sintering is also significantly affected.

The preparation of the slurry is compatible with either an organic slurry or an aqueous slurry; however, an aqueous slurry is preferable from the viewpoints of the environment and the cost. In the preparation of the slurry, for the purpose of improving the dispersibility of the primary particles, it is preferable to use a commercially available deflocculant (such as a polymer surfactant). Additionally, a defoaming agent or a surface modifier may also be used where necessary. When the hot-press sintering is selected, these steps can be omitted.

The Yttria granular powder obtained as described above is molded by the technique such as a mold pressing, a CIP (cold isostatic press) molding or a casting molding, and where necessary, the molded body is subjected to a green body machining by dry machining so as to achieve a rough shape.

When the hot-press sintering is selected, these steps are unnecessary.

As the surface-finishing treatment before the sintering, a mechanical processing such as machining or a hand working may be adopted, with the proviso that the treatment is preferably of a dry process. In the case where the whole or part of the sintered surface is applied, as it is, to a product, a technique such as an enclosed sintering or an embedded sintering may also be used for the purpose of reducing the contamination of the impurities from the atmosphere in the furnace.

In the case where the surface roughness finishing treatment after the later-stage sintering is not performed, the sintered surface can be put to practical use. Such a case is advantageous for the purpose of suppressing the particles because of the non-occurrence of grinding processing traces.

For the purpose of further compacting the sintered body and improving the material strength of the sintered body, the HIP (hot isostatic pressing) treatment and the like may be added after the sintering.

The sintering step may be performed as a constant pressure sintering in an atmospheric furnace under normal pressure at 1500 to 1700° C., or as a hot-press sintering (pressurized sintering) under a press pressure of 5 to 50 MPa at 1500 to 1640° C.

When the press pressure is too low, namely, as low as less than 5 MPa, the densification of the sintered body is insufficient. On the other hand, even when the processing is performed with a pressure higher than necessary, the densification effect tends to level off, and the risk in designing the safety (strength) on the side of the mold or the apparatus is enhanced. Therefore, in consideration of the equipment specifications, it is preferable to set the press pressure at 50 MPa or less.

When a non-oxidative atmosphere is selected in the hot-press sintering, problems such as oxygen defects in the sintered body and the residual stress due to the pressurized sintering are caused as the case may be. For the purpose of removing the effects of these problems, it is preferable to perform an annealing in an atmospheric furnace.

In the Yttria sintered body, a layer in which crystal grains are remarkably grown is generated in the region from the sintered outermost layer to the depth of approximately a few millimeters, as the case may be; however, such a layer can be easily removed by grinding processing of the surface layer. A definite interface is present between the grain grown section of the surface layer and the usual microstructure on the inside of such a section, and this inside portion is of a uniform microstructure (the variation of the average crystal grain size is small). The surface layer crystal grain growth section has features such that the color hue is different, and hence the completion of the removal by grinding of the concerned section can be verified. Alternatively, adoption of the below-described technique based on thermal etching enables a quantitative evaluation.

The conditions such as the treatment temperature and the treatment time of annealing can be changed optionally; from the viewpoint of suppressing the excessive crystal grain growth, the annealing temperature preferably does not exceed the sintering temperature.

After the sintering, the sintered body is machined into the intended product shape by various grinding methods, and then a polishing step, a surface roughening treatment or the like may be added to perform a surface roughness finishing treatment of the sintered body. When the surface roughening is performed after the sintering, a simple sand blasting method may be applied. Additionally, only a specific portion of the member may be subjected to surface roughening by masking. Surface smoothing by lapping or the like may be applied to the portion that requires surface smoothing from the viewpoint of the product design.

For the purpose of making the sinter high in purity, low in porosity and uniform in crystal grains, the material powder is once converted into a slurry, and the wet deionization or the wet removal of the inclusions is preferably performed. Additionally, there are various points to remember for the production method including the following: the setting, at the time of granulation, of the mixing amount of the binder according to the particle size and the like of the primary material so as to scarcely leave the uncrushed granules at the time of molding; and in the sintering step and the annealing step, the cleaning of sintered body, and the consideration of the arrangement in the furnace in such a way that the heat transfer and the heat capacity are made uniform. A sintering method in which sintering is performed while the object to be sintered is being embedded in a high-purity yttrium powder is also effective in improving the quality of the sintered body.

EXAMPLES

For the purpose of verifying the high bending strength and the effect of suppression of the scattering of particles of the present invention, the following experiments were first performed.

The following three powders were prepared: a high-purity Yttria powder having a purity of 99.9% and an average particle size of 0.1 µm, a high-purity Yttria powder having a purity of 99.9% and an average particle size of 1.0 µm, and an Yttria powder having a purity of 99.0% and an average particle size of 1.0 µm. A binder was added to each of the powders, the powders were granulated by spray drying, and then a molded body was obtained from each of the powders by CIP (cold isostatic press). The molded bodies thus obtained were sintered in an atmospheric furnace under normal pressure, and thus Yttria sintered bodies were obtained. Table 1 shows the conditions for the Yttria powders, the sintering temperatures, and the porosity, average crystal grain size, bending strength and etching rate of each of the Yttria sintered bodies. The porosity and others were obtained by the following methods.

<Purity of a Sinter>

A sintered body sample was pulverized, then dissolved, and the contents of the impurity elements (Al, Si, Mg, Ca, Fe, Cu, Cr, Ti, Ni, Mo, Li, Na, K) were measured by the ICP emission spectrometry and the flame analysis. For all the detected impurities, the detected contents (ppm) were converted into the contents of the corresponding oxides. The sum of the contents of the oxides was subtracted from 100% to derive the purity (%) of the yttrium oxide, wherein the figures below the first decimal place were omitted.

<Porosity of an Yttria Sintered Body>

The open porosity was calculated according to the method defined in JIS R 1634.

<Average Crystal Grain Size>

By applying a grinding processing to a sintered body, an optional cross section of the sintered body was cut out; the cross section was polished (Ra: about 0.05 µm) to form a mirror surface; an atmospheric heat treatment of the mirror polished surface was performed for heat etching the crystal grain boundary portion at the temperature of (sintering temperature −50)° C. specific for the concerned sintered body, and thus the crystal grain boundary of the mirror finished surface was visualized; and thereafter, the mirror finished surface was photographed by using an SEM (at a magnification of 250 to 5000×).

For each of the sintered bodies, about three optional portions were photographed, and the photographing magnification was set in such a way that the total number of the particles under observation in these portions amounted to about 200 to 500. The grain size of each of the crystal grains was defined as the average value of the major axis and the minor axis as follows:

Grain size=(major axis(the longest line that can be drawn)+minor axis(the axis on the line perpendicularly bisecting the major axis line))/2

The minimum crystal grain size that was able to be identified by this method was 0.2 μm. For each of the sintered bodies, the grain sizes of the individual visually identifiable crystal grains were measured on the photographs, a crystal grain size distribution curve in terms of the number of the grains was obtained, and then the 50% cumulative value (D50) and the 90% cumulative value (D90) were obtained.

The average crystal grain size of each of the sintered bodies was obtained as follows: the same photographs as used for the calculation of D50 and D90 were used and the whole scopes were the objects of the observation; the crystal grains completely included within each of the scopes were each counted as one crystal grain; the crystal grains intersected by the periphery of each of the scopes were each counted as one half of a crystal grain; thus, the total number of the crystal grains within the scopes was obtained by the accumulation of the number of the crystal grains; the total area of the photographic scopes was divided by the thus obtained total number of the crystal grains to derive the average area per one crystal grain; and finally, the square root value of the average area was defined as the average crystal grain size.

<Bending Strength>

The three-point bending strength at room temperature was measured according to JIS R 1601.

surface of the specimen was selectively subjected to plasma etching. After a 6-hour plasma etching processing was performed, the masking tape on the specimen was peeled off, the specimen was cleaned, and then the height difference between the plasma-exposed portion and the masked portion was measured with a probe-type step height meter. The height difference thus obtained was divided by the treatment time (6 hours) to calculate the etching rate (nm/min).

The plasma etching rate is varied depending on the factors such as the shape of the specimen and the placement position of the specimen in the plasma processing apparatus, and hence attention was paid for the adjustment of the conditions.

A weight method in which the etching rate is derived from the weight change between before and after the plasma processing is also applicable. For the materials of the present invention, even by using the weight method, approximately the same tendency and etching rate evaluation value as obtained by the step height method are obtained.

<Surface Roughness Ra>

By using a probe-type surface roughness meter, Ra was measured according to the JIS surface/shape measurement items (B 0651, etc.).

<Evaluation of Particles>

Various Yttria sintered bodies each processed into a ring shape corresponding to a silicon wafer of 300 mm in diameter and regulated with respect to the Ra of the plasma-exposed surface thereof were incorporated into a plasma CVD apparatus. By using this apparatus, a process including an etching processing with a fluorine-based plasma was performed for a 300-mm silicon wafer. The silicon wafer for which the processing had been completed was placed in a base material foreign matter testing apparatus (particle counter) based on a laser light scattering method, and the counting of particles and the mapping of the particles were performed. The case where the number of the particles having a particle size of 1 μm or more, identified on the silicon wafer, was less than five was evaluated as "satisfactory" and the case where the concerned number was five or more was evaluated as "poor."

TABLE 1

| | | Powder of Yttoria | | Sintered Body | | | |
|---|---|---|---|---|---|---|---|
| Classifications | | Average Particle Size (μm) | Purity (%) | Sintered Temparature (° C.) | Porosity (%) | Average Crystal Grain Size (μm) | Bending Strength (MPa) | Etching rate (nm/min) |
| Examples of the Present Invention | 1 | 0.1 | 99.9 | 1600 | 0.50 | 1.2 | 226 | 1.1 |
| | 2 | 0.1 | 99.9 | 1650 | 0.20 | 1.5 | 206 | 1.1 |
| | 3 | 0.1 | 99.9 | 1550 | 0.95 | 0.9 | 189 | 1.1 |
| Comparative Examples | 1 | 0.1 | 99.9 | 1500 | 5.50* | 0.5 | 170* | 1.5 |
| | 2 | 1.0 | 99.9 | 1650 | 1.50* | 1.5 | 107* | 1.3 |
| | 3 | 0.1 | 99.9 | 1750 | 0.10 | 23* | 98* | 1.2 |
| | 4 | 0.1 | 99.9 | 1800 | 1.00 | 35* | 64* | 1.3 |
| | 5 | 0.1 | 99.9 | 1650 | 0.15 | 2.0 | 165* | 1.4 |

*means it does not satisfy the requirement of the present invention.

<Plasma Etching Rate>

A specimen was obtained from a sintered body regulated to have a required surface roughness (Ra) by performing a surface treatment such as mirror polishing. A portion of the surface treated face of the specimen was masked with a polyimide tape, and then the specimen thus treated was placed in a processing chamber of a reactive ion etching (RIE) apparatus. Into the processing chamber, $CF_4$ gas was introduced as a plasma source at a flow rate of 100 ml/min. Under the conditions of a pressure of 10 Pa in the reaction chamber, a high frequency bias (13.56 MHz, about 1 kW) was applied to generate a plasma in the processing chamber and the masked As shown in Table 1, in each of Examples 1 to 3 satisfying all the conditions for the porosity, average crystal grain size and bending strength of the Yttria sintered body, the etching rate was small and the plasma corrosion resistance was high. In each of Comparative Examples 1 to 4 in which the Yttria sintered bodies did not satisfy at least any one of the conditions of the porosity of 1% or less, the average crystal grain size of 3 μm or less and the bending strength of 180 MPa or more, the etching rate was larger than the etching rates in Examples 1 and 2, and the plasma corrosion resistance was lowered. Additionally in Comparative Example 5, an Yttria sintered body was obtained by the same production method as in Example 2 except that a material powder slightly lower in purity (99.0%) was used; however, the obtained Yttria sintered body was unable to satisfy the condition of the bending strength of 180 MPa or more, and was poor in the plasma corrosion resistance. The possible reasons for this may include, for example, the effect of the segregation of the impurity components originating from the starting material into the grain boundary portion.

Successively, the Yttria sintered bodies of Example 2 and 3 and Comparative Example 3 subjected to the surface roughness regulation according to the methods shown in Table 2 were each subjected to a plasma processing and then to the measurements of bending strength and etching rate. "$E_0$" in Table 2 means the etching rate E of Example 2 in the cases of Examples 4 to 9, the etching rate E of Example 3 in the cases of Examples 10 to 12, and the etching rate E of Comparative Example 3 in the cases of Comparative Examples 6 to 8.

TABLE 2

| Classifications | | Porosity (%) | Surface Reguration Method | Surface Roughness before Plasma Treatment Ra (μm) | Average Crystal Grain Size (μm) | Bending strength (MPa) | Etching Rate E (nm/min) | Amount of Change $E/E_0$ |
|---|---|---|---|---|---|---|---|---|
| Examples of the Present Invention | 2 | 0.20 | Lapping | 0.05 | 1.5 | 206 | 1.1 | — |
| | 4 | 0.20 | Lapping | 0.01 | 1.5 | 206 | 1.1 | 1.00 |
| | 5 | 0.20 | Grinding (#800 whetstone) | 0.30 | 1.5 | 206 | 1.1 | 1.00 |
| | 6 | 0.20 | Grinding (#170 whetstone) | 1.30 | 1.5 | 206 | 1.1 | 1.00 |
| | 7 | 0.20 | Sandblasting (#800 sand) | 1.30 | 1.5 | 206 | 1.1 | 1.00 |
| | 8 | 0.20 | Sandblasting (#80 sand) | 2.80 | 1.5 | 206 | 1.2 | 1.09 |
| | 9 | 0.20 | Sandblasting (#50 sand) | 4.00 | 1.5 | 206 | 1.3 | 1.18 |
| | 3 | 0.95 | Lapping | 0.05 | 0.9 | 189 | 1.1 | — |
| | 10 | 0.95 | Grinding (#800 whetstone) | 0.40 | 0.9 | 189 | 1.2 | 1.09 |
| | 11 | 0.95 | Sandblasting (#800 sand) | 1.30 | 0.9 | 189 | 1.3 | 1.18 |
| | 12 | 0.95 | Sandblasting (#80 sand) | 2.80 | 0.9 | 189 | 1.4 | 1.27 |
| Comparative Example | 3 | 0.10 | Lapping | 0.05 | 23 | 98 | 1.2 | — |
| | 6 | 0.10 | Lapping | 0.11 | 23 | 98 | 1.2 | 1.00 |
| | 7 | 0.10 | Grinding (#800 whetstone) | 0.30 | 23 | 98 | 1.5 | 1.25 |
| | 8 | 0.10 | Sandblasting (#80 sand) | 2.80 | 23 | 98 | 2.3 | 1.92 | note:

The surface roughness of the LAP is regurated by changing the conditions such as abrasive grain types and grain size of commercial lapping processing solutions.

For the mirror polishing (lapping), a large number of lapping processing solutions are commercially available which include various types of abrasive grains having various grain sizes and in which an anti-rust agent, a dispersant and the like are mixed. Additionally, with respect to the lapping disc, various material qualities and various surface conditions can be selected. In the examples of Table 2, by selecting these items, the finishing conditions (Ra values) were regulated.

As shown in Table 2, in the examples shown in Examples 5 to 11, even when the Ra value was increased by surface roughening, the change of the etching rate was extremely small, and in any one of these examples, the etching rate E satisfied the relation of the following formula. Additionally, in Example 4, lapping was promoted to yield a product having an Ra value of 0.01 μm, and also in this case, the change of the etching rate was extremely small, and the etching rate E satisfied the relation of the following formula. Therefore, it can be seen that in these examples, the excellent plasma corrosion resistance was able to be maintained. On the other hand, in each of Comparative Examples 6 to 8 which used Comparative Example 3 deviating from ranges specified by the present invention for the porosity, bulk density, average crystal grain size and bending strength, the etching rate was increased and the plasma corrosion resistance was lowered with the increase of the Ra value.

$$E \leq 1.20 \times E_0$$

Next, the Yttria material powder used in Example 2 was used and molded by the same method as in Example 2, then the surface regulation treatment of the molded body shown in Table 3 was performed, and the thus treated molded body was sintered under the same conditions as in Example 2 to produce an Yttria sintered body. After the sintering, the grinding processing and the like were not performed, and the sintered surface of the sinter was subjected to plasma etching. Table 3 shows the surface roughness values before and after sintering and after plasma processing, and the etching rate.

TABLE 3

| Classifications | | Surface Reguration Method before sintering | Surface Roughness before PlasmaTreatment Ra (μm) | Etiching Rate | |
|---|---|---|---|---|---|
| | | | | E (nm/min) | Amount of Change E/E$_0$ |
| Examples of the Present Invention | 13 | Die Pressing | 0.46 | 1.1 | — |
| | 14 | Dry Machining | 1.06 | 1.1 | 1.00 |
| | 15 | Hand Working | 2.19 | 1.2 | 1.09 |
| | 16 | Hand Working | 3.50 | 1.2 | 1.09 | note:
The surface roughness of the No. 13 is as same as that of the smooth-surface of the die.
The surface roughness of the No. 14 is as same as that of machining-surface of the machine.
The surface roughness is regurated by using sandpaper of #100 or #400 in the Hand Working.

Also in each of Examples 13 to 16, even when surface roughening was performed to increase the Ra value, the etching rate E was little changed, and in other words, the relation of the above-described formula was satisfied and the excellent plasma corrosion resistance was able to be maintained.

Next, for Examples 2, 4, 8 and 11, and Comparative Example 7, the amount of the generated particles were investigated by the above-described method. The results thus obtained are shown in Table 4.

TABLE 4

| Materials | | Surface Roughness of plazma exposed potion before PlasmaTreatment Ra (μm) | E/E0 | Scattering of Particles |
|---|---|---|---|---|
| Example of the Present Invention | 2 | 0.05 | 1.00 | Satisfactry |
| | 4 | 0.01 | 1.00 | Poor |
| | 8 | 2.8 | 1.09 | Satisfactry |
| | 11 | 1.3 | 1.18 | Satisfactry |
| Comparative Example 7 | | 0.3 | 1.25 | Poor |

As shown in Table 4, it was found that when the Yttria sintered body of the present invention was used and further the Ra of the plasma-exposed portion was made to be 0.05 μm or more, the scattering of particles was suppressed.

Next, for the purpose of investigating the low dielectric loss effect of the present invention, a high-purity yttrium powder (purity: 99.5 to 99.9%, average particle size: 0.1 to 2.5 μm) was prepared, a slurry was prepared by using a defloculant in combination, and the slurry was subjected to deironization with a magnet, to removal of coarse precipitates by decantation and to the like.

A binder, a plasticizer, a defoaming agent and a lubricant were added to the slurry, Yttria granules were prepared by a spray drying method, then a molded body was produced by mold pressing and by cold isostatic molding. This molded body was sintered in an atmospheric furnace under normal pressure at 1500 to 1800° C. to yield a sintered body.

Additionally, the above-described high-purity yttrium powder (purity: 99.5 to 99.9%, average particle size: 0.1 to 2.5 μm) was prepared, a slurry was prepared by using a defloculant in combination, and the slurry was subjected to deironization with a magnet, to removal of coarse precipitates by decantation and to the like, and from the slurry as it was, without adding a binder, a granular powder was obtained after performing a spray drying step.

The starting material was beforehand subjected to a heat treatment to realize the condition of emitting no volatile component, then the starting material was placed in a carbon mold used for hot press, the starting material in the carbon mold was sintered in a hot press furnace in an argon atmosphere under a press pressure of 30 MPa at 1480 to 1650° C., the sinter was released from the dedicated mold, then the sintered body was annealed in an atmospheric furnace under normal pressure to yield an intended sintered body. The annealing temperature was set at 1500° C. in Examples 4 to 8 and Comparative Examples 9 to 12, and set at 1430° C. in Comparative Example 8.

The layer in which crystal grains were remarkably grown was present on the surface of the Yttria sintered body obtained as described above, and hence a 1- to 5-mm layer was removed from the surface of the Yttria sintered body by grinding processing. The amount of the ground layer was appropriately determined with reference to the color hue difference of the surface layer portion.

For each of the thus produced various Yttria sintered bodies, the porosity, the bulk density, the crystal grain size, the dielectric loss, the purity and the strength were measured. The dielectric loss was measured by the method shown below.

<Dielectric Loss>

The dielectric tangent (tan δ) in the region from 1 to 20 GHz was measured by means of a cavity resonator method and the maximum value was adopted.

TABLE 5

(Sintering of Normal Pressure)

| | | Material powder | | | Sintered Body | | | | | |
|---|---|---|---|---|---|---|---|---|---|---|
| Classifications | | Average of Particle Size (μm) | Purity (%) | Sintered Temp. (Atmospheric Furnace) | Purity (%) | Porosity (%) | Average Crystal Grain Size (μm) | D90/D50 rate | Bending Strength (MPa) | Dielectric Loss (×10⁻⁴) |
| Examples of the present Invention | 17 | 0.1 | 99.9 | 1600° C. | 99.9 | 0.5 | 1.2 | 1.9 | 226 | 0.5 |
| | 18 | 0.1 | 99.9 | 1650° C. | 99.9 | 0.2 | 1.5 | 1.8 | 206 | 0.3 |
| | 19 | 0.1 | 99.9 | 1550° C. | 99.9 | 0.95 | 0.9 | 2.5 | 189 | 0.8 |
| Comparative Examples | 9 | 0.1 | 99.9 | 1500° C. | 99.9 | 5.5* | 0.5 | 1.6 | 170 | 18 |
| | 10 | 1.0 | 99.9 | 1650° C. | 99.9 | 1.5* | 1.5 | 1.7 | 107 | 2.5 |
| | 11 | 0.1 | 99.9 | 1680° C. | 99.9 | 0.2 | 2.1 | 3.1* | 185 | 1.2 |
| | 12 | 0.1 | 99.9 | 1750° C. | 99.9 | 0.1 | 23* | 2.2 | 98 | 1.5 |
| | 13 | 0.1 | 99.9 | 1800° C. | 99.9 | 1.0 | 35* | 1.5 | 64 | 1.1 |
| | 14 | 0.1 | 99.5 | 1650° C. | 99.4* | 0.15 | 8* | 3.4* | 165 | 60 |
| | 15 | 0.1 | 99.5 | 1650° C. | 99.5* | 0.2 | 2.1 | 3.2* | 183 | 12 |

*means it does not satisfy the requirement of the present invention.

TABLE 6

(Hot Press sintering)

| | | Material powder | | | Sintered Body | | | | | |
|---|---|---|---|---|---|---|---|---|---|---|
| Classifications | | Average of Particle Size (μm) | Purity (%) | Sintered Temp. (Atmospheric Furnace) | Purity (%) | Porosity (%) | Average Crystal Grain Size (μm) | D90/D50 rate | Bending Strength (MPa) | Dielectric Loss (×10⁻⁴) |
| Examples of the present Invention | 20 | 1.0 | 99.9 | 1550° C. | 99.9 | 0.4 | 1.5 | 1.9 | 190 | 0.5 |
| | 21 | 1.0 | 99.9 | 1600° C. | 99.9 | <0.1 | 1.8 | 2.4 | 240 | 0.7 |
| | 22 | 1.0 | 99.9 | 1640° C. | 99.9 | <0.1 | 2.5 | 2.9 | 187 | 0.9 |
| | 23 | 0.1 | 99.9 | 1600° C. | 99.9 | <0.1 | 0.9 | 2.2 | 222 | 0.5 |
| Comparative Examples | 16 | 1.0 | 99.9 | 1480° C. | 99.9 | 2.0* | 1.1 | 1.6 | 122 | 14 |
| | 17 | 1.0 | 99.9 | 1650° C. | 99.9 | <0.1 | 3.2* | 3.5* | 165 | 1.1 |
| | 18 | 2.5 | 99.9 | 1600° C. | 99.9 | 0.7 | 4.6* | 6.0* | 175 | 1.8 |
| | 19 | 1.0 | 99.5 | 1600° C. | 99.5* | <0.1 | 5.0* | 8.8* | 162 | 85 |
| | 20 | 1.0 | 99.9 | 1600° C. (Non-anneal) | 99.8* | <0.1 | 1.8 | 2.4 | 245 | 25 |

*means it does not satisfy the requirement of the present invention.

As shown in Tables 5 and 6, in each of Examples 1 to 8 of the present invention, the purity, porosity, average crystal grain size and cumulative frequency ratio (D90/D50) of the sinter were all within the ranges specified in the present invention, and hence the bending strength and the dielectric loss were both satisfactory values; however, in each of Comparative Examples 1 to 12 in which at least any one of the conditions was not satisfied, both or one of the bending strength and the dielectric loss did not attain the targeted level.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The Yttria sintered body of the present invention has a bending strength of 180 MPa or more which is at an extremely high level as the bending strength of an Yttria sintered body obtained by ordinary sintering. Under the most appropriate conditions, a bending strength as high as 200 MPa or more is realizable. Consequently, it comes to be possible to control over a wide range the surface roughness of the Yttria sintered body to be used as a corrosion-resistant member. Further, the Yttria sintered body of the present invention undergoes a small decrease in the plasma etching rate even when the surface is roughened.

Accordingly, when part or the whole of the Yttria sintered body of the present invention is surface-roughened and the thus processed Yttria sintered body of the present invention is used at least as a corrosion-resistant member exposed to a halogen-based corrosive gas or the plasma of the halogen-based corrosive gas in a plasma processing apparatus, it is also possible to prevent the scattering of particles while a high plasma corrosion resistance is being maintained. The Yttria sintered body of the present invention is excellent in material strength as compared to conventional Yttria sintered bodies, and hence is easily made thin in wall thickness and is developable into products such as products improved in heat transfer. Additionally, the Yttria sintered body of the present invention can be produced even by normal pressure sintering, and hence it comes to be possible to perform product designs for such complicated shapes and large size products that undergo restrictions in the case of hot-press sintering or hot isostatic press (HIP method) sintering.

According to the present invention, in addition to the high plasma corrosion resistance characteristic of Yttria, the bending strength is 180 MPa or more, the scattering of particles is small, and further a low dielectric loss is realized in such a way that the dielectric loss tan δ is $1\times10^{-4}$ or less in a frequency range from 1 to 20 GHz. Accordingly, when the Yttria sintered body of the present invention is used as a structural member of a plasma processor, the attenuation of the microwave and the heat generation accompanying this attenuation are suppressed, and the plasma generation efficiency is significantly improved. In particular, the Yttria sintered body of the present invention has a high bending strength so as to enable the member to be reduced in wall thickness, and also is an advantageous material with respect to the output power of the microwave, the efficiency aspect, the thermal design and the like. Additionally, the present invention enables to realize the reduction of the dielectric loss of the RF wave and the like in the frequency range of less than 1 GHz and hence is also effective in applications using frequencies less than 1 GHz.

The invention claimed is:

1. An yttria sintered body having a bending strength of 180 MPa or more and a dielectric loss tan δ of $1\times10^{-4}$ or less in the frequency range from 1 to 20 GHz, wherein the yttria sintered body contains yttria of 99.9% by mass or more, has a porosity of 1% or less and an average crystal grain size of 3 μm or less, has a surface roughness (Ra) of 0.05 to 5 μm, and the cumulative frequency ratio calculated from the following formula is 3 or less:

$$\text{cumulative frequency ratio} = D90/D50$$

where, the individual symbols D90 and D50 are calculated as follows:

D90: the crystal grain size (μm) at which the cumulative number of grains as calculated from the smaller grain size side is 90% in a grain size distribution below; and D50: the crystal grain size (μm) at which the cumulative number of grains as calculated from the smaller grain size side is 50% in the grain size distribution below, where the grain size distribution is obtained by the following steps:

(1) taking a photograph of crystal grain microstructure of the yttria sintered body;

(2) measuring a major axis and a minor axis on the crystal grains;

(3) calculating an average grain size by averaging out the major axis and the minor axis; and (4) counting the number of each average grain size.

2. The yttria sintered body according to claim 1 having an average crystal grain size thereof is 2 μm or less.

3. A component used for a plasma processing apparatus, wherein at least the portion of the component exposed to a halogen-based corrosive gas or the plasma of the halogen-based corrosive gas is constituted with the yttria sintered body according to claim 1.

4. A component used for a plasma processing apparatus, wherein at least the portion of the component exposed to a halogen-based corrosive gas or the plasma of the halogen-based corrosive gas is constituted with the yttria sintered body according to claim 2.

* * * * *